United States Patent [19]

Dobbs et al.

[11] 4,249,710
[45] Feb. 10, 1981

[54] RELOADABLE CASSETTE

[75] Inventors: Fred J. Dobbs; Marshall W. Taylor, both of Duncanville; Rinda S. Gulley, Carrolton, all of Tex.

[73] Assignee: Dobbs-Stanford, Irving, Tex.

[21] Appl. No.: 131,858

[22] Filed: Mar. 19, 1980

Related U.S. Application Data

[63] Continuation of Ser. No. 948,015, Oct. 2, 1978, abandoned.

[51] Int. Cl.³ .......................... G03B 1/04; G11B 15/32
[52] U.S. Cl. .................................................. 242/199
[58] Field of Search .............. 242/71.1, 71.2, 197–200; 220/336, 337, 339; 229/44 R, 44 CB

[56] References Cited

U.S. PATENT DOCUMENTS

| | | | |
|---|---|---|---|
| 1,859,523 | 5/1932 | Neely | 229/44 R |
| 2,911,161 | 11/1959 | Proctor | 242/200 X |
| 3,385,422 | 5/1968 | Lowry | 229/44 R |
| 3,432,111 | 3/1969 | Ryder | 242/199 |
| 3,495,787 | 2/1970 | Wallace | 242/199 |
| 3,697,014 | 10/1972 | Lowry et al. | 242/197 |
| 3,756,329 | 9/1973 | Dolby | 242/197 |
| 3,820,738 | 6/1974 | Collins | 242/197 |

*Primary Examiner*—Leonard D. Christian
*Attorney, Agent, or Firm*—Richards, Harris & Medlock

[57] ABSTRACT

A cassette (10) includes an upper cassette portion (12) connected to a lower cassette portion (14) by a living hinge (16). The cassette portions (12) and (14) are pivotal about the hinge (16) from a closed position to an open position. A snap-lock catch (42) is provided for securing the cassette portions (12) and (14) in the closed position. In this construction, the cassette portions (12) and (14) may be pivoted to an open position to allow the removal of magnetic tape reels (30) and to allow the cassette (10) to be reloaded with new magnetic tape reels.

12 Claims, 6 Drawing Figures

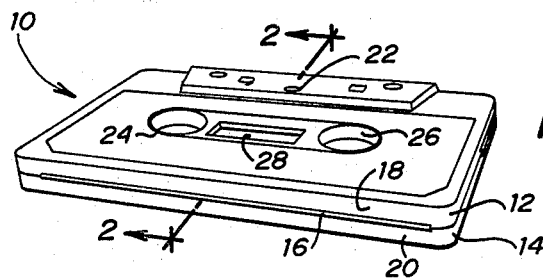
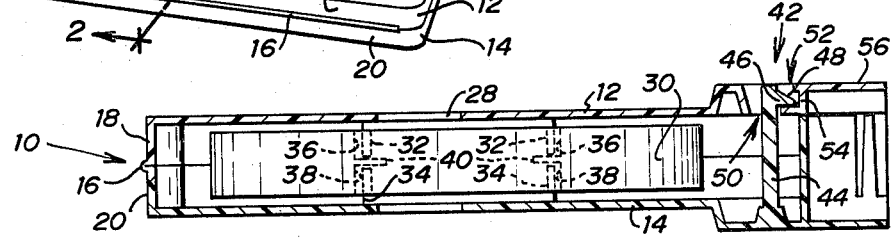
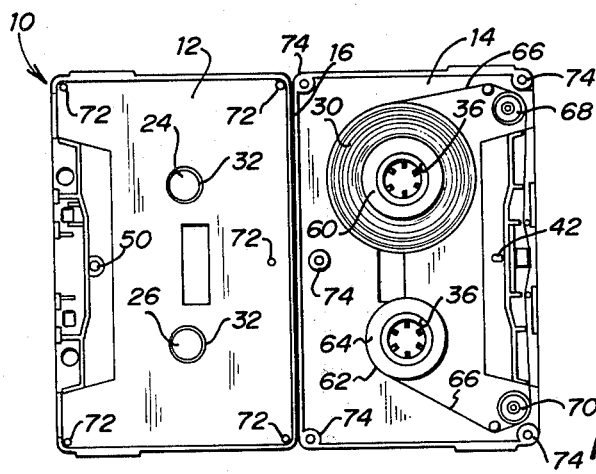
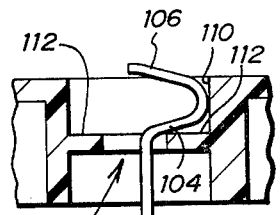
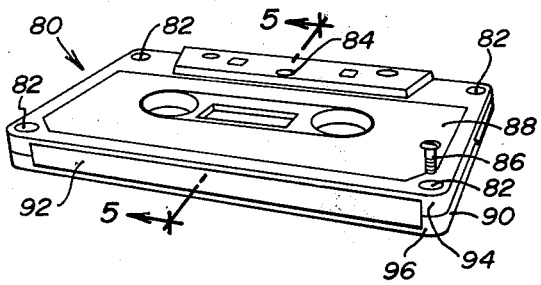
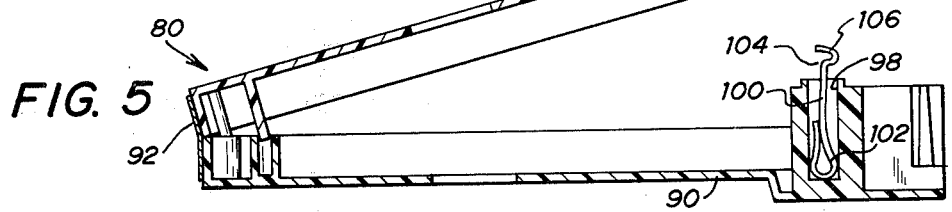

RELOADABLE CASSETTE

This is a continuation of application Ser. No. 948,015 filed Oct. 2, 1978 now abandoned.

TECHNICAL FIELD

The present invention relates to devices for handling and storing magnetic tape, and particularly relates to cassettes for magnetic tapes.

BACKGROUND OF ART

Magnetic tapes are widely used for storage of information, such as in sound and video tape recorders. One device for handling and storing magnetic tape is a cassette. Typically, a cassette includes two reels adjacently positioned for rotation within the cartridge and spaced apart a sufficient distance to allow the magnetic tape to be wound and stored on the reels. The magnetic tape is fed from one reel to the exterior of the cassette for interfacing with a recorder or player. The tape is then fed back into the cassette for storage on the other reel.

Such cassettes are generally much larger and bulkier than the magnetic tape contained and stored within the cassette. To provide economical interface with recording machines, the cassettes are usually manufactured in a standardized size to fit the recording machine. The standardized size is often many times larger than necessary to store and handle the desired length of magnetic tape. Thus, for a variety of reasons, the cassette is usually bulky in comparison to the reels of magnetic tape contained therein.

In many businesses, such as the insurance business, statements and other information are recorded on magnetic tape rather than in written form. Often, it is necessary to store the magnetic tapes in a file for future reference. Although cassettes are convenient devices for storing and handling magnetic tape during the recording process, the cassette is bulky and not well suited for storage in conventional files. Thus, magnetic tape has been previously reeled out of the cassette shell for separate storage in a file.

When the magnetic tape is reeled or pulled out of the cassette shell, it is possible to tangle or otherwise damage the tape. Also, it is a tedious operation to remove the reels of magnetic tape by reeling. Therefore, a need has arisen for an improved cassette that allows easy removal and replacement of the magnetic tape for storage in a separate file. Such improved cassette would eliminate or reduce the inefficiencies associated with previously known techniques for removing magnetic tape from standard cassettes and would enable the user to reload the cassette with new reels of magnetic tape. Use of such improved cassette would thus result in savings of time and money.

DISCLOSURE OF INVENTION

The foregoing and other problems associated with magnetic tape cassettes are eliminated by the present invention in which a cassette for magnetic tape includes an upper cassette portion and a lower cassette portion. Both the upper and lower cassette portions include an outer edge and interior and exterior sides. A hinge is attached between the outer edges of the upper and lower cassette portions enabling the cassette portions to pivot about the hinge for movement from a closed position with the interior sides of the cassette portions in an adjacent facing relationship to an open position exposing the interior sides of the cassette portions. A catch or a snap lock secures the upper and lower cassette portions together in the closed position.

In accordance with a further aspect of the present invention, cylinders extend from the interior side of at least one of the cassette portions for rotatably supporting two reels within the cassette. A single magnetic tape is wound on both reels so that the magnetic tape may be transferred from one reel to the other. When the upper and lower cassette portions are in the closed position, the cylinders rotably support the reels. However, when the cassette portions are moved to the open position, the reels and magnetic tape carried thereon are readily removable.

In accordance with another aspect of the present invention, the catch used to secure the upper and lower cassette portions together is a snap lock type fastener. The catch includes a flexible projection extending upwardly from the lower cassette portion with a clasp portion extending laterally from the top of the projection. An aperture extends through the upper cassette portion and has a diameter of sufficient size to receive the flexible projection and clasp portion. A counterbore is formed in the exterior side of the upper cassette portion superimposed on the aperture to form a catch surface adjacent the aperture and between the exterior and interior sides of the upper cassette portion. The clasp portion is adapted to engage the catch surface to secure the upper and lower cassette portion in a closed position. The flexible projection is resilient to bias the clasp portion to engage the catch surface and is flexible for bending to disengage and release the clasp portion from the catch surface. An inclined portion is formed on the top of the flexible projection above the clasp portion for engaging the aperture to align the flexible projection and the clasp portion with the aperture when the upper and lower cassette portions are moved to the closed position. In this construction, the counterbore contains the clasp portion and the inclined portion, and the inclined portion is disposed inwardly from the surface of the exterior side of the upper cassette portion in the closed position.

In accordance with another aspect of the present invention, the hinge formed between the upper and lower cassette portions is a plastic living hinge integrally formed with the cassette portions. Alternately, the hinge may be formed by a length of tape adhesively secured to the outer edges of the upper and lower cassette portions.

BRIEF DESCRIPTION OF THE DRAWINGS

The advantages and further aspects of the present invention will be readily appreciated by those of ordinary skill in the art by reference to the following Detailed Description when taken in conjunction with the Drawings in which:

FIG. 1 is a perspective view of a reloadable, snap lock cassette embodying the present invention;

FIG. 2 is a cross sectional view of the cassette taken along line 2—2 shown in FIG. 1;

FIG. 3 is a top view of upper and lower cassette portions fully opened and rotated about a hinge;

FIG. 4 is a perspective view of a modified conventional cassette;

FIG. 5 is a cross sectional view taken generally through line 5—5 in FIG. 4 showing an upper cassette portion rotated slightly open; and FIG. 6 is a detail view of the snap-lock catch engaging the upper cassette portion.

DETAILED DESCRIPTION

Referring now to FIG. 1, there is shown a perspective view of a reloadable, snap-lock cassette 10 embodying the present invention. The cassette 10 includes an upper cassette portion 12 mounted adjacent and engaging a lower cassette portion 14. A hinge 16 is formed between an outer edge 18 of the cassette portion 12 and an outer edge 20 of the lower cassette portion 14.

The cassette portions 12 and 14 may rotate about the hinge 16 from a closed position as shown in FIG. 1 to an open position as shown in FIG. 3 as will hereinafter be described in more detail. The hinge 16 is preferably constructed of plastic as an integral part of cassette portions 12 and 14, which are also preferably constructed from plastic. The hinge 16 is of a construction commonly referred to as a "living hinge". However, it will be understood that any suitable hinge may be used between the cassette portions 12 and 14.

A counterbore 22 is formed on the exterior surface of the upper cassette portion 12. Within the counterbore 22, a catch mechanism is provided for selectively locking the cassette 10 in the closed position as shown in FIG. 1. Apertures 24 and 26 extend through the cassette 10 and receive the drive mechanisms of a recording and/or playing machine in a conventional manner. A window 28 is formed in the cassette 10 for viewing the magnetic tape contained within cartridge 10.

Referring now to FIG. 2, there is shown a cross sectional view of the cassette 10 taken generally through line 2—2 shown in FIG. 1. In this view, a roll 30 of magnetic tape is shown mounted within the cassette 10 on a pair of cylinders 32 and 34. The cylinders 32 and 34 extend inwardly from the upper cassette portion 12 and the lower cassette portion 14, respectively, and are shown partially in phantom indicating that the cylinders 32 and 34 are hidden within the magnetic tape roll 30. The cylinders 32 and 34 are in a spaced apart opposing relationship forming an axle for the magnetic tape roll 30. Races 36 and 38 engage the exterior of the cylinders 32 and 34, respectively, and are free to rotate thereon. Spokes 40 extend inwardly between the flanges 32 and 34 and are used for rotatably driving the magnetic tape roll 30.

Referring now to the rear of the cassette 10, a cross sectional view of hinge 16 is shown between the outer edges 18 and 20. In this view, it may be appreciated that the hinge 16 is a "living hinge" integrally formed with the upper and lower cassette portions 12 and 14. To enable the cassette portions to engage one another at the interface between edges 18 and 20, the hinge 16 protrudes from the cassette 10 and is generally U-shaped.

The front portion of the cassette 10 includes a snap-lock catch 42 for securing the upper and lower cassette portions 12 and 14 in a closed position. The catch 42 includes a flexible projection 44 extending upwardly from the lower cassette portion 14. A clasp portion 46 is formed on the top of the projection 44 extending laterally therefrom, and an inclined surface 48 is also formed on the top of the projection 44 above the clasp portion 46.

An aperture 50 is formed extending through the upper cassette portion 12, and a counterbore 52 is formed above and superimposed on the aperture 50 to create a catch surface 54 adjacent the aperture 50. The catch surface 54 is disposed within the counterbore 52 below an exterior surface 56 of the upper cassette portion 12.

When the cassette portions 12 and 14 are moved from the open position to the closed position, the inclined surface 48 engages the aperture 50 to align the projection 44 and the clasp portion 46 with the aperture 50. The projection 44 flexes to allow this alignment. Then, the clasp portion 46 passes through the aperture 50, and the projection snaps back to the position shown in FIG. 2 to engage the clasp portion 46 with the catch surface 54. The interaction between the clasp portion 46 and the catch surface 54 is operable to secure the cassette portions 12 and 14 in the closed position. To open the cassette 10, projection 44 is bent rearwardly, and cassette portions 12 and 14 are pivoted apart. The counterbore 52 is dimensioned sufficiently large to contain the clasp portion 46 and inclined surface 48. In this manner, both the clasp portion 46 and inclined surface 48 are disposed below the outer surface 56 of the upper cassette portion 12.

Referring now to FIG. 3, the cassette 10 is shown in the fully open position with the upper cassette portion 12 being secured to and beside the lower cassette portion 18 by the hinge 16. The cylinders 32 extending from the upper cassette portion 12 are dimensioned to fit within and engage the races 36. In this view, it may be seen that the magnetic tape roll 30 is carried on a reel 60 and a second magnetic tape roll 62 is carried on a second reel 64. The races 36 are formed in the reels 60 and 64.

The magnetic tape 66 extends between the magnetic tape rolls 62 and 30 around the rollers 68 and 70 to the exterior of the cassette 10 for interfacing with a recording machine. This interface construction is conventional.

With the cylinders 32 removed from the races 36, the magnetic tape rolls 30 and 62 and the magnetic tape 66 may be removed from the cassette 10 along with the reels 60 and 64. Then, replacement rolls of magnetic tape may be installed in the cassette 10.

A plurality of alignment pins 72 extend from the interior side of the upper cassette cartridge 12, and mating alignment sleeves 74 extend from the interior side of the lower cassette portion 14. When the upper and lower cassette portions 12 and 14 are moved to the closed position, the pins 72 are inserted into the sleeves 74 to provide alignment and structural integrity for the cassette 10.

Referring now to FIG. 4, there is shown a conventional cassette 80 modified in accordance with the present invention. In this particular conventional cassette 80, screw holes 82 are formed in each corner thereof and a screw hole 84 is formed adjacent the center of the front edge of cassette 80. Screws, such as screw 86, were used to secure upper and lower cassette portions 88 and 90 together to form the cassette 80. However, to modify the cassette 80 in accordance with the present invention, the screws such as screw 86 are removed, and adhesive tape 92 is adhesively secured along the rear outer edges 94 and 96 of the cassette portions 88 and 90, respectively. The adhesive tape 92 forms a hinge for the modified cassette 80. Also, a catch mechanism is installed to engage the screw hole 84 which will be hereinafter described in more detail.

There is shown in FIG. 5 a cross sectional view of the modified cassette 80 taken generally along the line 5—5 shown in FIG. 4 with the upper cassette portion 88 pivoted upwardly. Thus, in this view, it may be appreciated that the adhesive tape 92 functions as a hinge for the modified cassette 80.

The front end of the cassette 80 includes a bore 98 formed in the lower cassette portion 90. Originally, the bore 98 was adapted to receive a screw. However, in the modified cassette 80, a projection 100 is inserted into the bore 98, and a loop portion 102 is formed on the lower end of the projection 100 to frictionally engage the bore 98 and secure the projection therein. Additionally, an adhesive may be applied within the bore 98 to the loop portion 102 to further secure the projection 100.

A clasp 104 is formed adjacent the top of the projection 100, and an inclined surface 106 is also formed on the top of the projection 100 above the clasp 104. An aperture 108 is formed in the upper cassette portion 88 dimensioned to receive the inclined surface 106 and the clasp 104. A counterbore 110 in the upper cassette portion 88 is superimposed on the aperture 108 and forms a catch surface 112 adjacent the aperture 108.

The operation of the clasp 104 may best be understood by reference to FIG. 5 taken in conjunction with FIG. 6 which shows a broken away detail view of the clasp 104 with the upper cassette portion in a closed position. When the upper and lower cassette portions 88 and 90 are moved to the closed position, the inclined surface 106 engages the aperture 108 to align the clasp 104 and the projection 100 with the aperture 108. The projection 100 is flexible to allow such alignment. After the clasp 104 passes through the aperture 108, the resiliency of the projection 100 forces the clasp 104 to snap forward engaging the catch surface 112. Thus, the clasp 104 engages the catch surface 112 to secure the upper and lower cassette portions 88 and 90 in the closed position.

The clasp 104 is inclined slightly upwardly away from the lower cassette portion 90 and towards the upper cassette portion 88. Because of this inclination, the clasp 104 is operable to hold the cassette portions 88 and 90 together, but when a sufficient force is applied to pry the cassette portions 88 and 90 apart, the inclination of clasp 104 will cause the clasp to snap rearwardly away from the catch surface 112 to a release position allowing the cassette portions 88 and 90 to move to the open position. It will be understood that the clasp 104 may also be released by applying a manual rearward force to the inclined surface 106. It will also be understood that the clasp 46 (FIG. 2) may likewise be constructed with an upward inclination so that a force tending to pry cassette portions 12 and 14 apart, upon reaching a sufficient magnitude, will force the clasp 46 rearwardly, so that the cassette 10 may be opened by simply applying a sufficiently large opening force.

Although particular embodiments have been described in the foregoing Detailed Description, it will be understood that the invention is capable of numerous rearrangements, modifications and substitutions of parts without departing from the scope of the invention. In particular, it is noted that a wide variety of conventional cassettes may be modified in accordance with the present invention. Conventional cassettes that have upper and lower cassette portions heat sealed or adhesively secured together, as well as cassettes employing fasteners, may be modified in accordance with the present invention to provide an easily reloadable cassette having a snap-lock and hinge construction.

We claim:

1. A reloadable cassette for magnetic tape carried on two reels, comprising:
   an upper cassette portion having an outer edge and interior and exterior sides;
   a lower cassette portion dimensioned to mate with said upper cassette portion and having an outer edge and interior and exterior sides;
   a hinge attached between the outer edges of said upper and lower cassette portions;
   said upper and lower cassette portions being pivotal about said hinge for movement from a closed position with the interior sides of said cassette portions in an adjacent facing relationship to an open position exposing the interior sides of said cassette portions to allow removal of the magnetic tape and two reels; and
   catch means for securing said upper and lower cassette portions in the closed position;
   said catch means comprising:
   a sleeve extending upwardly from the lower cassette portion in a direction towards the upper cassette portion;
   a metal elongate projection having a lower portion forceably inserted into said sleeve for frictional engagement therewith;
   a clasp portion formed adjacent the top of said projection;
   an inclined portion formed on the top of said projection above said clasp portion;
   an aperture formed in the upper cassette portion for receiving said inclined portion, said clasp portion and said projection;
   said inclined portion being operable to engage said aperture to align said clasp portion and projection with said aperture when said upper and lower cassette portions are moved from the open position to the closed position;
   a catch surface formed within said aperture for engaging said clasp portion to secure said upper and lower cassette portions in the closed position.

2. The cassette of claim 1 further comprising cylinders extending from the interior side of at least one of said cassette portions for rotatably supporting the reels within the cassette when said upper and lower cassette portions are in the closed position, whereby the reels are removable from the reloadable cassette when said upper and lower portions are moved to the open position.

3. The cassette of claim 1 wherein said hinge comprises a length of tape adhesively secured along the outer edges of said upper and lower cassette portions.

4. The cassette of claim 1 further comprising:
   a plurality of alignment pins extending upwardly from said lower cassette portion; and
   a plurality of alignment sleeves extending downwardly from said upper cassette portion for snugly receiving said alignment pins when said upper and lower cassette portions are moved to the closed position.

5. The cassette of claim 1 wherein said upper and lower cassette portions are constructed of plastic.

6. The cassette of claim 1 wherein said magnetic tape has a defined path of travel between said reels, and wherein said catch means is disposed inboard of said travel path.

7. The cassette of claim 1 wherein said cassette has a tape exposure interface port in the outer edges of said cassette portions opposite said hinge.

8. In a cassette for magnetic tape, said tape being carried on two reels and traveling over a defined path of travel between said reels, said cassette being molded of plastic and having an upper cassette portion with an outer edge and interior and exterior sides and a lower cassette portion dimensioned to mate with said upper cassette portion and having an outer edge and interior and exterior sides, said cassette further having a tape exposure interface port in the outer edge of said cassette portion, the improvement comprising:

flexible hinge means attached opposite said tape exposure interface port and between the outer edges of said upper and lower cassette portions, said upper and lower cassette portions being pivotal about said hinge means for movement between a closed position with the interior sides of said cassette portions in an adjacent facing relationship and an open position exposing the interior sides of said cassette portions to allow removal of the magnetic tape and two reels;

catch means being positioned within said structure to receive fasteners and engaging said fastener structure, said catch means being designed so that a force tending to pry said cassette open, upon reaching a sufficient magniture, will open said cassette;

said catch means being inboard of said outer edge and actuated by said pivotal movement toward the closed position; and said hinge means and catch means allowing opening of said cassette portions to expose said reels of magnetic tape and to enable removal of the reels of magnetic tape for storage without the requirement of storage of a bulky cassette, and further permitting additional reels of magnetic tape to be inserted within said cassette for magnetic recording use.

9. The improved cassette of claim 8 wherein said hinge means comprises a length of tape adhesively secured along the outer edges of said upper and lower cassette portions.

10. The improved cassette of claim 8 wherein said structure to receive fasteners comprises a sleeve extending upwardly from the lower cassette portion in a direction towards the upper cassette portion and an aperture formed in the upper cassette portion.

11. The improved cassette of claim 10 wherein said catch means comprises:

a metal elongate projection having a lower portion forceably inserted into said sleeve for frictional engagement therewith;

a clasp proportion formed adjacent the top of said projection;

an inclined portion formed on the top of said projection above said clasp portion;

said aperture formed in the upper cassette portion receiving said inclined portion, said clasp portion and said projection;

said inclined portion being operable to engage said aperture to align said clasp portion and projection with said aperture when said upper and lower cassette portions are moved from the open position to the closed position; and said aperture having a catch surface formed therein for engaging said clasp portion to secure said upper and lower cassette portions in the closed position.

12. A method for modifying a cassette containing reels of magnetic tape, said cassette having an upper cassette portion with an outer edge and interior and exterior sides, a lower cassette portion with an outer edge and interior and exterior sides, and fasteners for securing the upper cassette portion to the lower cassette portion with the interior sides of the cassette portions in an adjacent facing relationship; the method comprising:

removing the fasteners to release the upper cassette portion from the lower cassette portion;

prying the upper cassette portion apart from the lower cassette portion;

installing a catch on the lower cassette portion for selectively securing the upper cassette portion to the lower cassette portion; and hingedly attaching the outer edge of the upper cassette portion to the outer edge of the lower cassette portion, whereby said cassette portions may move from a closed position with the catch securing the upper and lower cassette portions together to an open position exposing the interior sides of the cassettes allowing removal of the reels of magnetic tape.

* * * * *